(12) United States Patent
Kim

(10) Patent No.: US 7,443,465 B2
(45) Date of Patent: Oct. 28, 2008

(54) COLOR FILTER PLATE AND THIN FILM TRANSISTOR PLATE FOR LIQUID CRYSTAL DISPLAY, AND METHODS FOR FABRICATING THE PLATES

(75) Inventor: Dong-Gyu Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/977,684

(22) Filed: Oct. 16, 2001

(65) Prior Publication Data
US 2003/0043318 A1 Mar. 6, 2003

(30) Foreign Application Priority Data
Aug. 30, 2001 (KR) ............... 2001-52829

(51) Int. Cl.
G02F 1/1335 (2006.01)
G02F 1/13 (2006.01)

(52) U.S. Cl. ................... 349/106; 349/187

(58) Field of Classification Search ......... 349/106–110, 349/187
See application file for complete search history.

(56) References Cited

U.S. PATENT DOCUMENTS

| | | | |
|---|---|---|---|
| 5,568,293 A * | 10/1996 | Takao et al. | 349/106 |
| 5,633,739 A * | 5/1997 | Matsuyama et al. | 349/106 |
| 5,725,975 A * | 3/1998 | Nakamura et al. | 430/5 |
| 6,057,900 A | 5/2000 | Ono et al. | 349/110 |
| 6,271,902 B1 * | 8/2001 | Ogura et al. | 349/106 |
| 6,392,728 B2 * | 5/2002 | Tanaka et al. | 349/106 |
| 6,407,782 B1 * | 6/2002 | Kim | 349/106 |
| 6,473,141 B2 * | 10/2002 | Moseley et al. | 349/15 |
| 6,509,688 B1 * | 1/2003 | Bae et al. | 313/504 |
| 6,567,150 B1 * | 5/2003 | Kim | 349/187 |

FOREIGN PATENT DOCUMENTS

| | | |
|---|---|---|
| JP | 6-3518 | 1/1994 |
| JP | 06130217 | 5/1994 |
| JP | 06-202098 | 7/1994 |
| JP | 08-095021 | 4/1996 |
| JP | 09-073078 | 3/1997 |

(Continued)

*Primary Examiner*—Dung T. Nguyen
(74) *Attorney, Agent, or Firm*—MacPherson Kwok Chen & Heid, LLP.; David S. Park

(57) ABSTRACT

A color filter substrate for a liquid crystal display includes a substrate, a black matrix formed on the substrate, and a plurality of color filters formed on the substrate with the black matrix. Each color filter has a flat central portion, and a peripheral portion placed on the black matrix with a thickness smaller than the central portion. A common electrode is formed on the plurality of color filters. A thin film transistor array substrate for the liquid crystal display includes a substrate, a plurality of gate lines formed on the substrate, a plurality of data lines crossing over the gate lines while defining pixel regions, a thin film transistor formed at each pixel region, and a plurality of color filters. Each color filter has a flat central portion, and a peripheral portion placed on the data lines with a thickness smaller than the central portion. Contact holes expose the drain electrodes, and pixel electrodes are connected to the drain electrodes through the contact holes.

7 Claims, 16 Drawing Sheets

| | FOREIGN PATENT DOCUMENTS | | KR | 1020000060595 | 10/2000 |
|---|---|---|---|---|---|
| JP | 09-189904 | 7/1997 | KR | 10-0293433 | 4/2001 |
| JP | 10-268292 | 10/1998 | | | |
| JP | 11-337926 | 12/1999 | * cited by examiner | | |

COLOR FILTER PLATE AND THIN FILM TRANSISTOR PLATE FOR LIQUID CRYSTAL DISPLAY, AND METHODS FOR FABRICATING THE PLATES

BACKGROUND OF THE INVENTION (a) Field of the Invention

The present invention relates to a color filter substrate and a thin film transistor array substrate for a liquid crystal display.

(b) Description of the Related Art

Generally, a liquid crystal display has two substrates with electrodes, and a liquid crystal layer sandwiched between the two substrates. Voltages are applied to the electrodes so that the liquid crystal molecules in the liquid crystal layer are re-oriented to thereby control the light transmission. The electrodes may be all formed at one of the substrates. Furthermore, in order to make color expressions on the screen, color filters of red, green and blue may be formed at one of the substrates.

Recently, in the case of monitors or televisions, the thickness of the color filter has been enlarged to enhance the color representation thereof. However, in this case, the periphery of the color filter may involve a stepped difference so large as to change the molecular orientation of the liquid crystal while causing disclination. Furthermore, the periphery of the color filter is liable to be under-cut while causing leakage of light at the black display state, and deteriorating the picture quality.

SUMMARY OF THE INVENTION

It is an object of the present invention to provide a liquid crystal display which exhibits improved picture quality while preventing miss-orientation of liquid crystal molecules and leakage of light.

This and other objects may be achieved by a liquid crystal display with a color filter substrate, and a thin film transistor array substrate.

The color filter substrate includes a substrate, a black matrix formed on the substrate, and a plurality of color filters formed on the substrate with the black matrix. Each color filter has a flat central portion, and a peripheral portion placed on the black matrix with a thickness smaller than the central portion. A common electrode is formed on the plurality of color filters.

The neighboring color filters are overlapped with each other over the black matrix. The neighboring color filters are structured such that the peripheral portion of the overlying color filter is overlapped with the peripheral portion of the underlying color filter. Alternatively, the peripheral portion of the overlying color filter may be overlapped with the peripheral portion of the underlying color filter as well as partially with the central portion of the underlying color filter. Furthermore, the neighboring color filters may be spaced apart from each other with a predetermined distance.

In a method of fabricating the color filter substrate, a black matrix is first formed on a substrate. A plurality of color filters are sequentially formed on the substrate with the black matrix. Each color filter has a flat central portion, and a peripheral portion placed on the black matrix with a thickness smaller than the central portion. A common electrode is formed on the plurality of color filters.

The color filters are formed using a mask differentiated in the light transmission while bearing a transparent pattern, an opaque pattern and a semitransparent pattern. The semitransparent pattern of the mask is placed over the peripheral portion of the color filter during the formation of the color filter.

The thin film transistor array substrate includes a substrate, a plurality of gate lines formed on the substrate, a plurality of data lines crossing over the gate lines while defining pixel regions, a thin film transistor formed at each pixel region, and a plurality of color filters. Each color filter has a flat central portion, and a peripheral portion placed on the data lines with a thickness smaller than the central portion. Contact holes expose the drain electrodes, and pixel electrodes are connected to the drain electrodes through the contact holes. The neighboring color filters are overlapped with each other over the data lines.

The neighboring color filters are structured such that the peripheral portion of. the overlying color filter is overlapped with the peripheral portion of the underlying color filter. Alternatively, the neighboring color filters may be structured such that the peripheral portion of the overlying color filter is overlapped with the peripheral portion of the underlying color filter as well as partially with the central portion of the underlying color filter. Furthermore, the neighboring color filters may be spaced apart from each other with a predetermined distance.

In a method of fabricating the thin film transistor array substrate, a substrate is processed such that it has a plurality of gate lines, a plurality of data lines crossing over the gate lines while defining pixel regions, and thin film transistors provided at the pixel regions while being electrically connected to the gate lines and the data lines. A plurality of color filters are formed in a sequential manner such that each color filter has a flat central portion, and a peripheral portion placed on the data lines with a thickness smaller than the central portion. Contact holes are processed such that they expose drain electrodes of the thin film transistors. A plurality of pixel electrodes are processed such that they are connected to the drain electrodes through the contact holes.

The color filters are formed using a mask differentiated in the light transmission while bearing a transparent pattern, an opaque pattern and a semitransparent pattern. The semitransparent pattern of the mask is placed over the peripheral portion of the color filter during the formation of the color filter.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
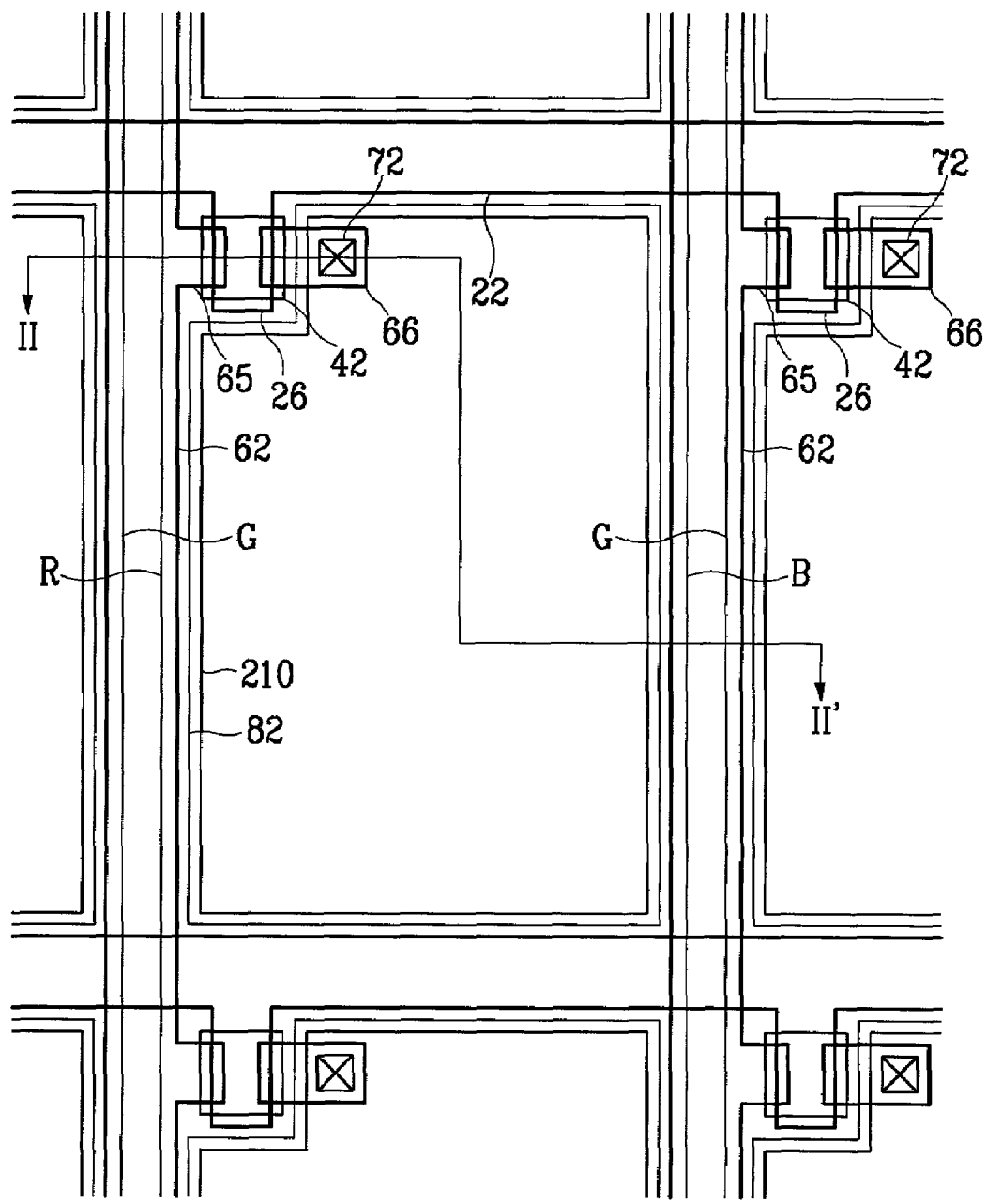
FIG. 1 is a plan view of a liquid crystal display with a color filter substrate and a thin film transistor array substrate according to a preferred embodiment of the present invention.
Figure 2:
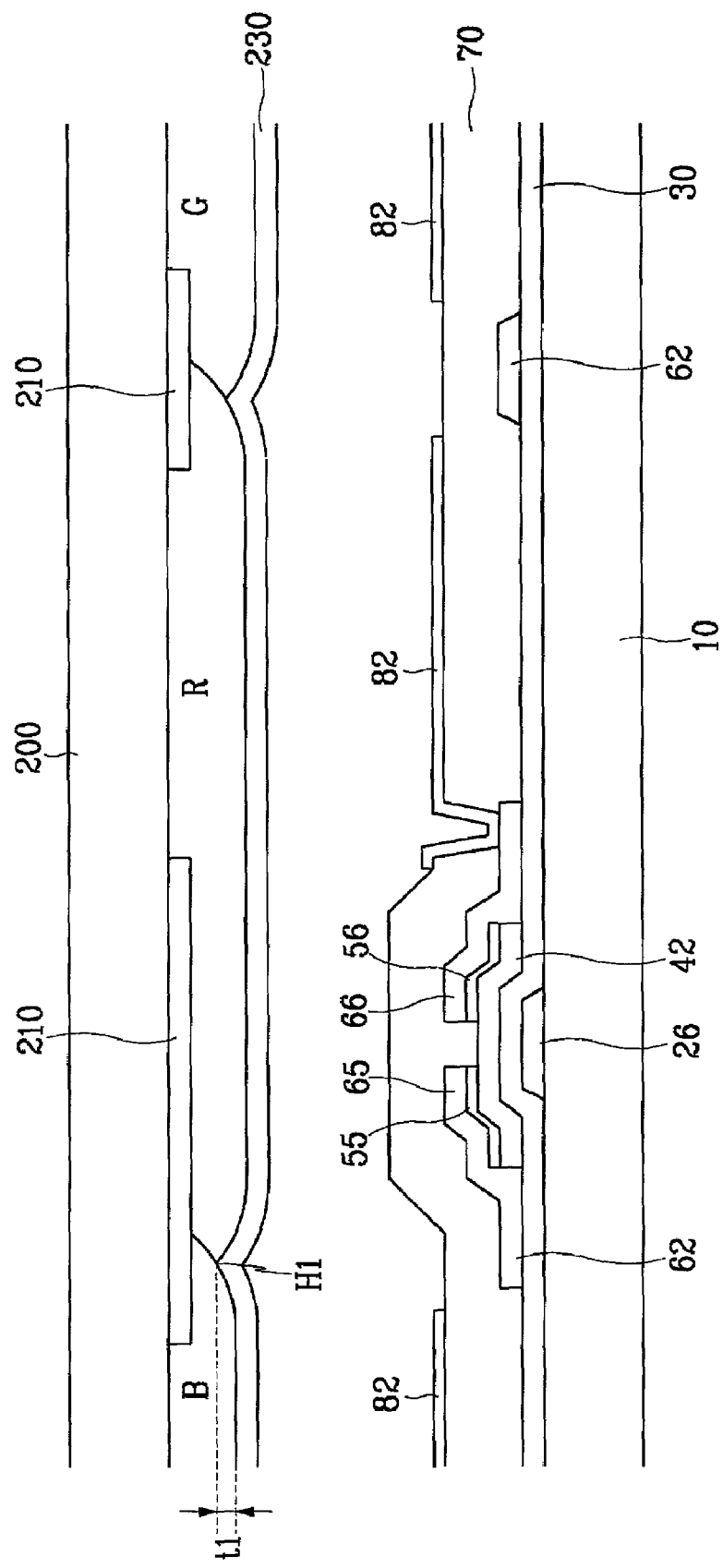
FIG. 2 is a cross sectional view of the liquid crystal display taken along the II-II' line of FIG. 1.

FIG. 1 is a liquid crystal display with a color filter substrate according to a preferred embodiment of the present invention, and FIG. 2 is a cross sectional view of the liquid crystal display taken along the II-II' line of FIG. 1.

In the thin film transistor array substrate, a gate line assembly is formed on a first insulating substrate 10 with a metallic material such as molybdenum (Mo), a molybdenum-tungsten (MoW) alloy, chrome (Cr), tantalum (Ta), and titanium (Ti). The gate line assembly includes gate lines 22 proceeding in the horizontal direction, and gate electrodes 26 connected to the gate lines 22 as parts of the thin film transistors. The gate line assembly may have a multiple-layered structure where one layer is formed with an aluminum-based conductive material bearing a low resistance, and the other layer with a material bearing a good contact characteristic in relation to other materials.

A gate insulating layer 30 is formed on the first insulating substrate 10 with silicon nitride while covering the gate line assembly.

A semiconductor pattern 42 is formed on the gate insulating layer 30 with amorphous silicon while corresponding to the gate electrodes 26. Ohmic contact patterns 55 and 56 are formed on the semiconductor pattern 42 with amorphous silicon where impurities are doped at high concentration.

A data line assembly is formed on the ohmic contact patterns 55 and 56, and the gate insulating layer 30 with molybdenum (Mo), a molybdenum-tungsten (MoW),alloy, chrome (Cr), tantalum (Ta), and titanium (Ti). The data line assembly includes data lines 62 crossing over the gate lines 22 while defining pixel regions, source electrodes 65 protruded from the data lines 62 while contacting the one-sided ohmic contact pattern 55, and drain electrodes 66 contacting -the, opposite-sided ohmic contact pattern 56 while being separated from the source electrodes 65 around the gate electrodes 26.

The data line assembly may have a multiple-layered structure where one layer is formed with an aluminum-based conductive material bearing a low resistance, and the other layer with a material bearing a good contact characteristic in relation to other materials.

A protective layer 70 is formed on the gate insulating layer 30 with an insulating material such as silicon nitride while covering the data line assembly and the semiconductor pattern 42.

Contact holes 72 are formed at the protective layer 70 while exposing the drain electrodes 66. Pixel electrodes 82 are formed on the protective layer 70 such that they are connected to the drain electrodes 66 through the contact holes 72.

In the color filter substrate, a black matrix 210 is formed on a second insulating substrate 200 such that it is overlapped with the gate lines 22, the data lines 62 and the semiconductor pattern 42 of the thin film transistor array substrate while exposing the internal area of the pixel electrode 82.

Stripe-shaped color filters of R, G and B each with a predetermined width are alternately formed on the second insulating substrate 200 with the black matrix 210.

Each color filter is patterned to bear a flat central portion, and a peripheral -portion positioned on the black matrix 210 with a thickness-smaller than the central portion.

The peripheral portion of the color filter gradually slopes down. The peripheral portions of the neighboring color filters are overlapped with each other over the black matrix 210. The difference t1 in height between the overlapped peripheral portion H1 of the color filter with a smallest thickness and the central portion thereof should be established to be ½ or less of the thickness of the central portion of the color filter to reduce the stepped difference of the color filter.

In the above structure, the step coverage characteristic of the layers covering the color filters to be processed later can be enhanced, and the resulting color filter substrate can be flattened while preventing miss-orientation of the liquid crystal molecules.

A common electrode 230 is formed on the color filters with ITO or IZO while covering the latter.

The steps of fabricating the color filter substrate will be now explained with reference to FIGS. 3 to 7.

Figure 3:
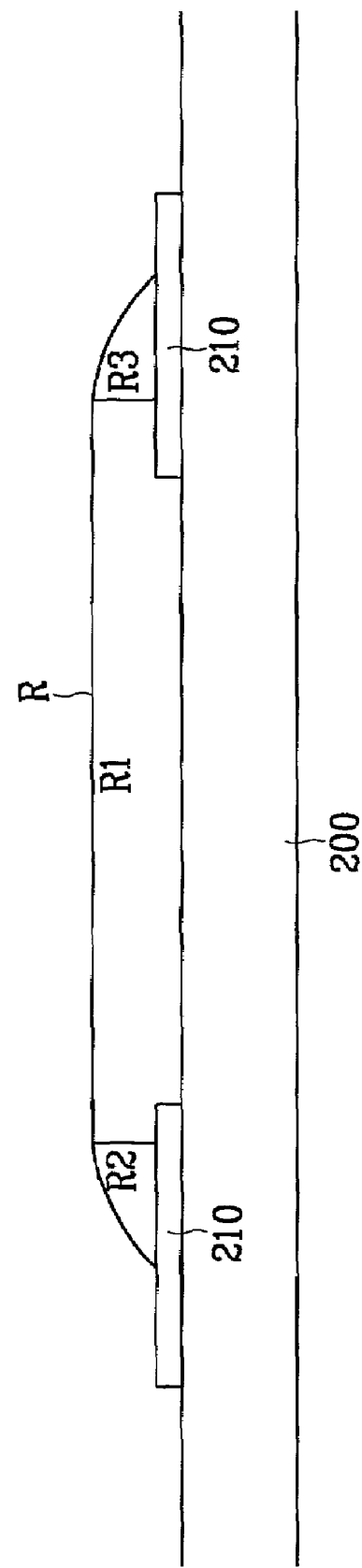
FIG. 3 illustrates the first step of fabricating the color filter substrate shown in FIG. 1.
Figure 4:
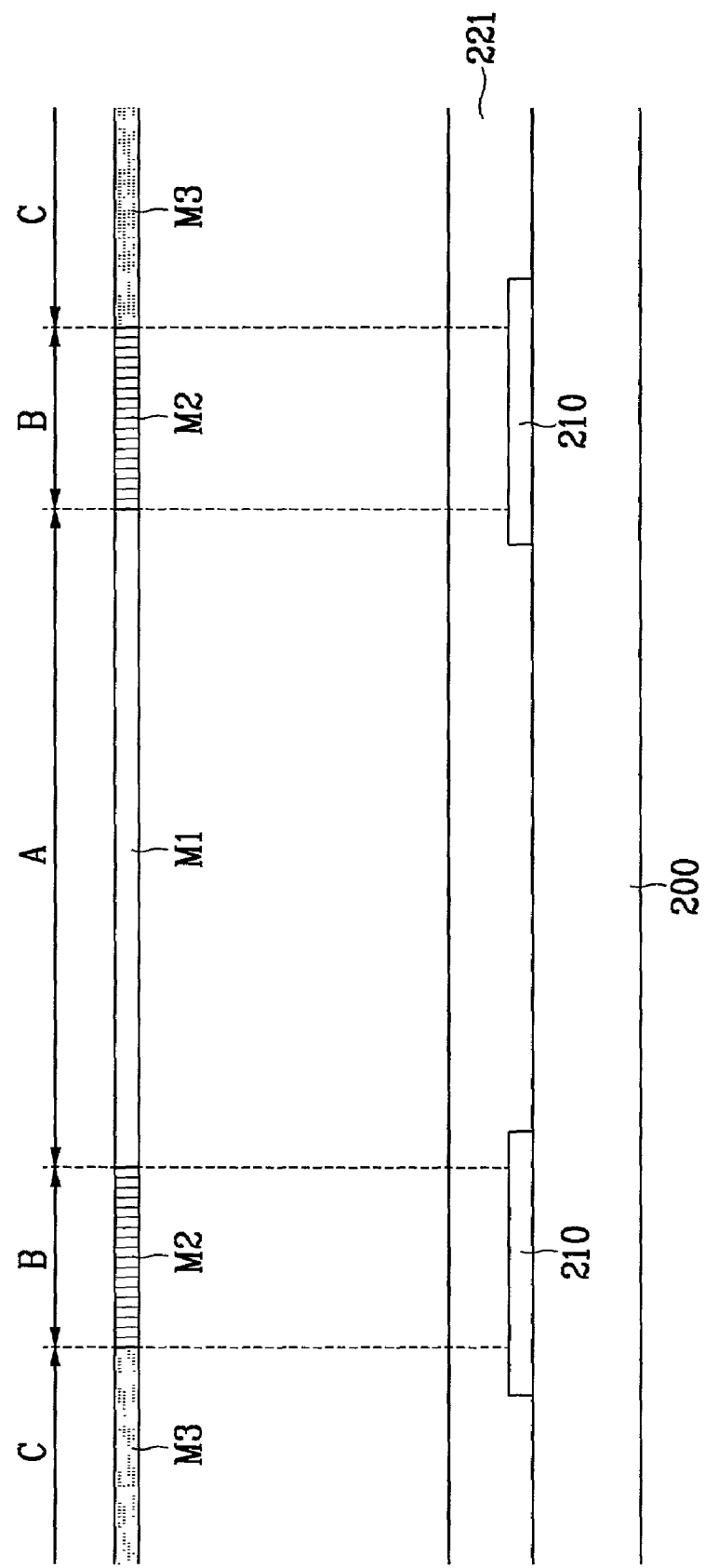
FIG. 4 illustrates the intermediate step of fabricating the color filter substrate shown in FIG. 1.

As shown in FIG. 3, a metallic layer based on chrome or a chrome alloy is deposited onto an insulating substrate 200, and processed through photolithography to thereby form a black matrix 210. The black matrix 210 may bear a single or double-layered structure. Furthermore, the black matrix 210 may be formed with a black organic insulating material.

Thereafter, red color filters R are formed on the insulating substrate 200 with the black matrix 210. The central portion R1 of each color filter R is formed with a flat shape, and the peripheral portions thereof R2 and R3 are placed on the black matrix 210 with a thickness smaller than the central portion R1.

The color filters R may be formed through one photolithography process based on a mask differentiated in the light transmission. This process will be now explained with reference to FIG. 4.

A negative photosensitive organic film 221 of red color is coated onto the insulating substrate 200 with the black matrix 210, and exposed to light using a mask M differentiated in the light transmission.

The mask M has a transparent pattern M1, an opaque pattern M3, and a semitransparent pattern M2. The semitransparent pattern M2 of the mask M may be formed with a slit or lattice pattern, or a semitransparent film. In the case of the slit pattern, it is preferable that the slit width should be smaller than the light decomposition capacity of the light-exposing device. In the case of the semitransparent film, the mask M may be formed with thin films differentiated in the light transmission, or the thickness.

When the photosensitive organic film 22 is exposed to light using the mask M, the portion A thereof directly exposed to the light is completely hardened, the portion B thereof corresponding to the semitransparent pattern M2 is hardened by a predetermined thickness, and the portion C thereof intercepted by the opaque pattern M3 is not hardened. When the light exposing time is too long, the organic film 221 is liable to be completely hardened.

When the selectively light-exposed organic film is developed, as shown in FIG. 3, only the hardened portions thereof are left over. At this time, the portion B of the organic film corresponding to the semitransparent pattern M2 bears a thickness smaller than the portion A thereof corresponding to the transparent pattern M1. The A portion of the organic film becomes to be the central portion R1 of the red color filter, and the B portion thereof to be the peripheral portions R2 and R3 while bearing a thickness smaller than the central portion R1.

When the developed organic film is heat-treated, the peripheral portions R2 and R3 of the color filter R become to bear a smooth slope-down profile.

In order to obtain a uniform color representation, it is preferable that the peripheral color filter portions R2 and R3 should be placed only over the black matrix 210. For this purpose, the semitransparent mask pattern M2 is established to bear a width smaller than the pattern with of the black matrix 210 while being positioned corresponding to the black matrix 210 through aligning the mask M and the substrate 200.

Figure 5:
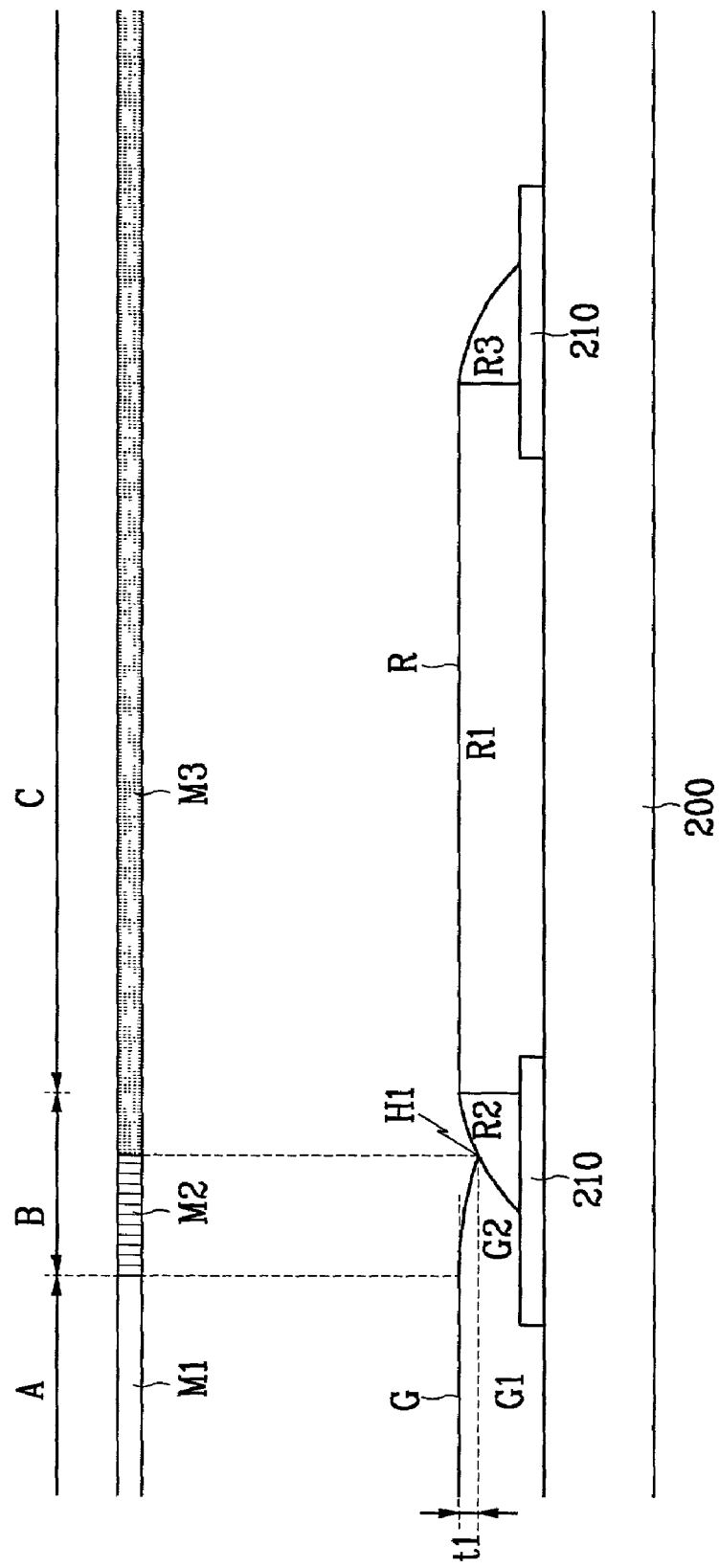
FIG. 5 illustrates the step of fabricating the color filter substrate shown in FIG. 1 following the step illustrated in FIG. 3.

Thereafter, as shown in FIG. 5, green color filters G are formed at the substrate 200 such that each green color filter G has a flat central portion G1, and a peripheral portion G2 placed on the black matrix 210 with a thickness smaller than the central portion G1.

For that purpose, a negative photosensitive film of green color is coated onto the entire surface of the substrate, exposed to light, and developed as with the formation of the red color filters R. In this process, the peripheral portion G2 of the green color filter G is overlapped with the peripheral portion R2 of the neighboring red color filter R over the black matrix 210.

It is required that the end of the semitransparent pattern M2 of the mask corresponding to the end of the peripheral portion G2 of the green color filter G should be placed within the peripheral portion R2 of the neighboring red color filter R. When the light-exposing and developing operations are made under such a condition, a color filter portion H1 bearing the smallest thickness is existent at the overlapping area of the red and green color filters. The difference in height t1 between the H1 portion of the color filter and the flat central portion of thereof is preferably controlled to be ½ or less of the thickness of the central color filter portion.

In this way, the stepped difference of the color filter is reduced, and the layers covering the color filters to be processed later become to bear improved step coverage characteristic while flattening the resulting substrate.

Figure 6:
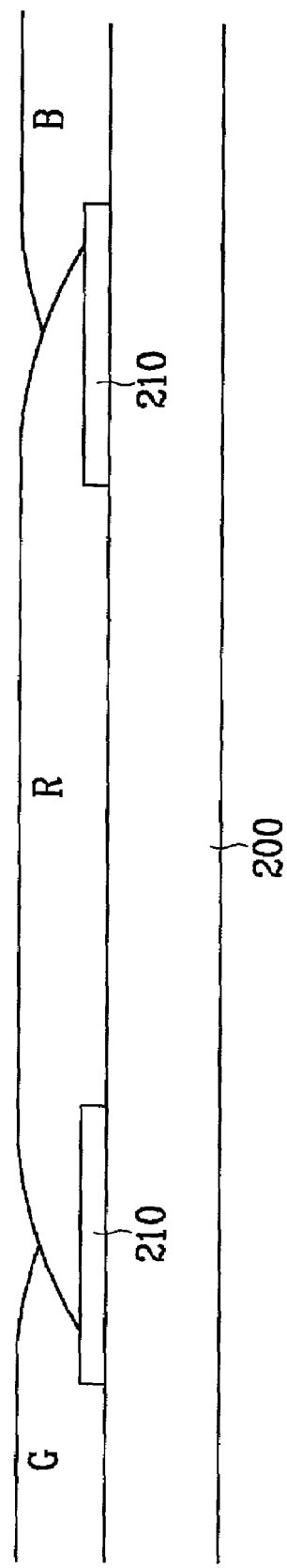
FIG. 6 illustrates the step of fabricating the color filter substrate shown in FIG. 1 following the step illustrated in FIG. 5.

Thereafter, as shown in FIG. 6, blue color filters B are formed in the same way as with the formation of the green color filters G such that the central portion thereof is flat, and the peripheral portion thereof has a thickness smaller than the central portion while being placed over the black matrix 210.

For that purpose, a negative photosensitive film of blue color is coated onto the entire surface of the substrate, exposed to light, and developed. Then the subsequent processing steps are made with respect to the photosensitive film. In this way, the color filter substrate is completed.

Figure 7:
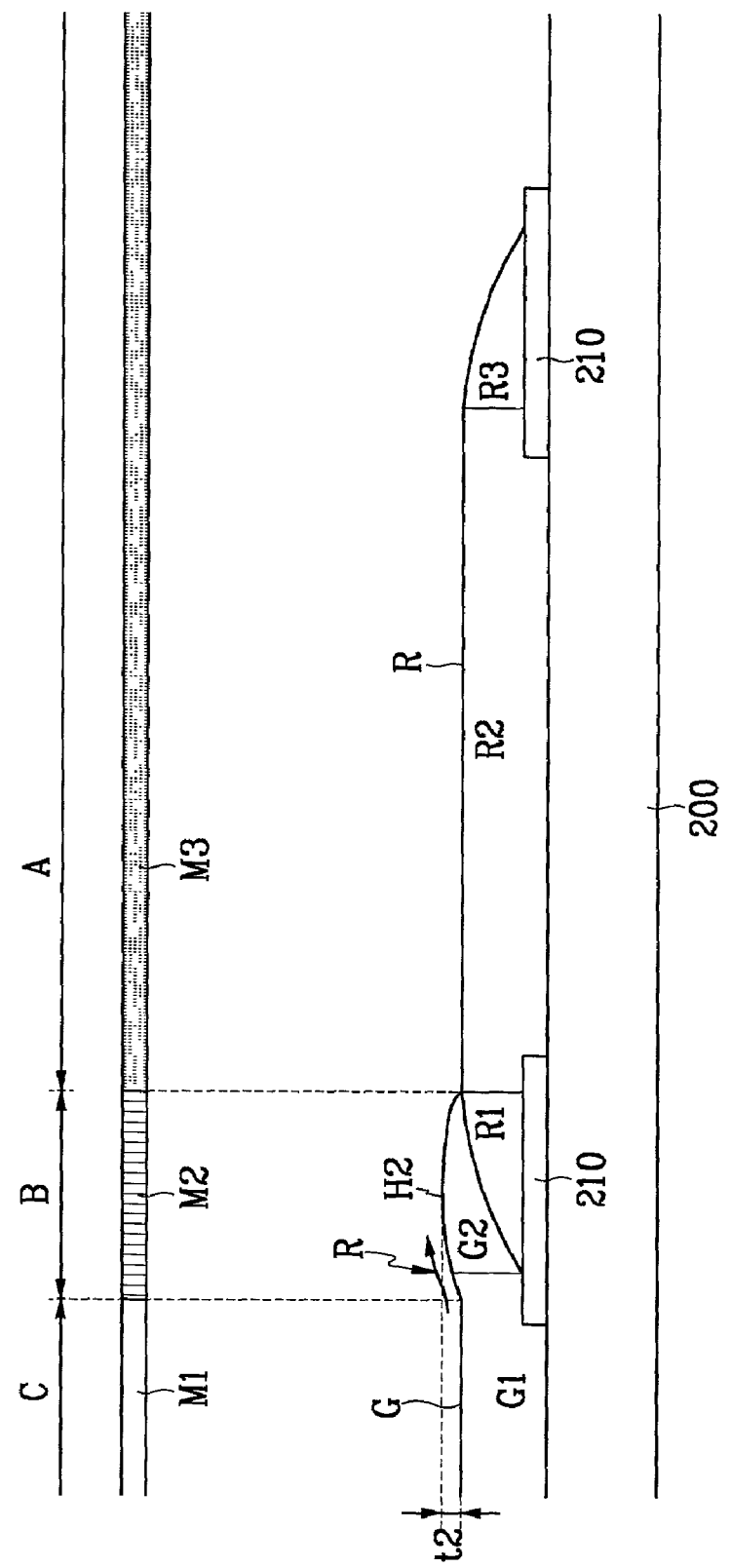
FIG. 7 is a cross sectional view of a color filter substrate for a liquid crystal display according to another preferred embodiment of the present invention where the step of fabricating the color filter substrate following that illustrated in FIG. 3 is illustrated.

Meanwhile, as shown in FIG. 7, when the green color filter G is formed after the formation of the red color filters R, the end of the semitransparent mask pattern M2 corresponding to the end of the peripheral portion G2 of the green color filter G may be placed at the central portion R1 of the neighboring red color filter R. When the light-exposing and developing operations are, made, the peripheral portion G2 of the green color filter G covers the neighboring red color filter R. In this case, a color filter layer portion H2 with a largest thickness is existent at the overlapping area of the R and G color filters. The difference in height t2 between the color filter layer portion H2 and the central color filter portion is preferably established to be ½ or less of the thickness of the central color filter portion.

Blue color filters are subsequently formed at the substrate in the same way as with the formation of the green color filters G.

In the subsequent process, when an alignment film is coated, and rubbed by way of a rubbing roll wound with a rubbing cloth, alignment failure is liable to be made with the stepped difference due to the overlapping of the neighboring color filters. In order to prevent such an alignment failure, the slightly stepped portion is preferably located in the rubbing direction standing with the side of entrance of the rubbing roll.

As the peripheral portion G2 of the green color filter G covering the peripheral portion R2 of the red color filter R bears a slow upward slope R, the rubbing is preferably established to be directed toward the slope R.

Meanwhile, the blue color filter may cover another peripheral portion R3 of the red color filter R. In this case, the stepped difference due to the overlapping of the blue color filter and the red color filter is so small as to not cause the rubbing failure.

Figure 8:
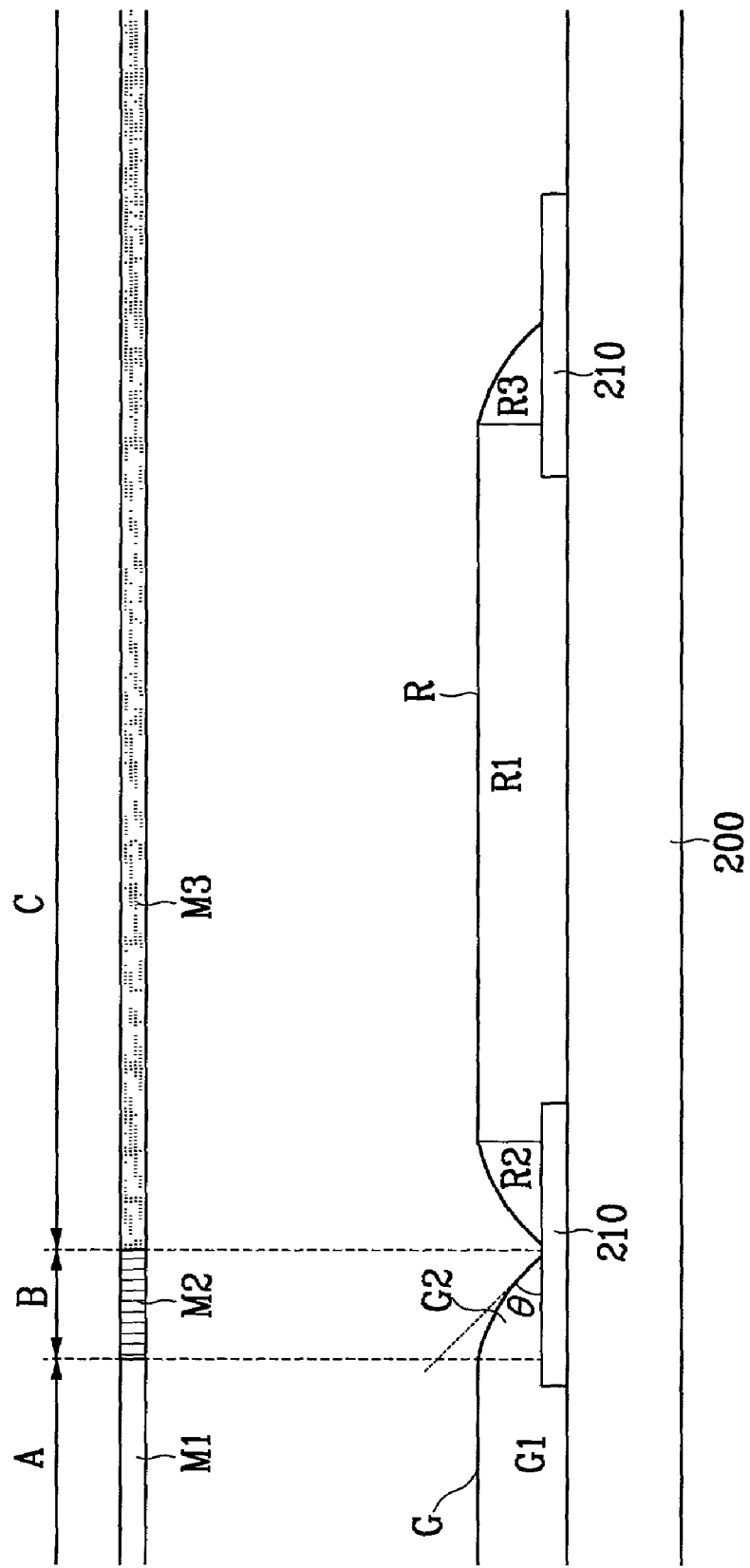
FIG. 8 is a cross sectional view of a color filter substrate for a liquid crystal display according to still another preferred embodiment of the present invention where the step of fabricating the color filter substrate following that illustrated in FIG. 3 is illustrated.

Furthermore, as shown in FIG. 8, the mask and the substrate may be aligned such that when the green color filters G are formed after the formation of the red color filters R, the end of the semitransparent mask pattern M2 corresponding to the end of the peripheral portion G2 of the green color filter G does not reach the peripheral portion R1 of the neighboring red color filter R. In this case the green color filter G is spaced apart from the red color filter R with a predetermined distance. In order to reduce the stepped difference, the peripheral portions R2 and G2 of the red and green color filters R and G are established to bear an inclination degree of 40° or less. For this purpose, it is required that the light transmission of the semitransparent mask pattern M2 should be controlled in an appropriate manner. For instance, one or two slits with a width of 3-4 μm may be formed within the mask area with a width of 10 μm.

Blue color filters are subsequently formed in the same way as with the formation of the green color filters.

Alternatively, a positive photosensitive organic film may be used to form the color filters. In this case, the transparent pattern and the opaque pattern are formed in the reverse order. Furthermore, the sequence of formation of red, green and blue color filters may be changed in various manners.

Figure 9:
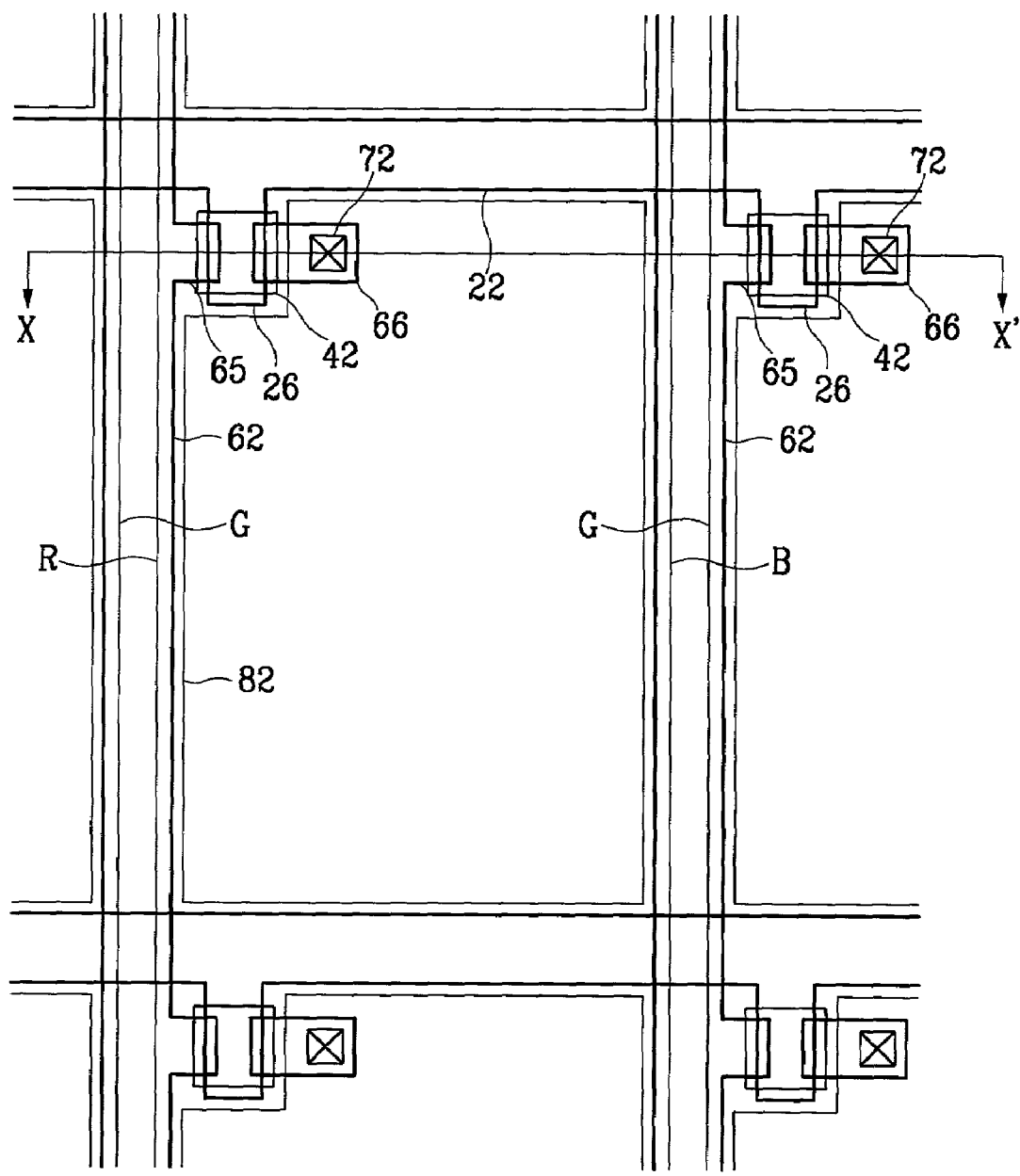
FIG. 9 is a plan view of a thin film transistor array substrate for a liquid crystal display according to still another preferred embodiment of the present invention.
Figure 10:
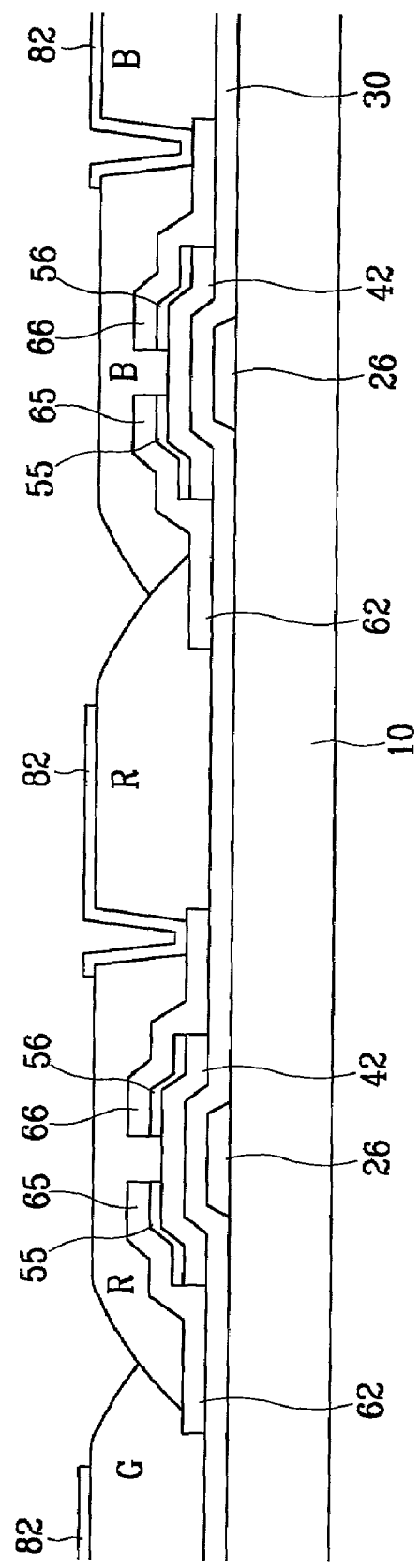
FIG. 10 is a cross sectional view of the thin film transistor array substrate taken along the X-X' line of FIG. 9.

FIG. 9 is a plan view of a thin film transistor array substrate for a liquid crystal display according to another preferred embodiment of the present invention, and FIG. 10 is a cross sectional view of the thin film transistor array substrate taken along the X-X' line of FIG. 9.

A gate line assembly is formed on an insulating substrate 10 with a metallic material such as molybdenum (Mo), a molybdenum-tungsten (MoW) alloy, chrome (Cr), tantalum (Ta), and titanium (Ti). The gate line assembly includes gate lines 22 proceeding in the horizontal direction and gate electrodes 26 connected to the gate lines 22 as parts of thin film transistors. The gate line assembly may have a multiple-layered structure where one layer is formed with an aluminum-based conductive material bearing a low resistance, and the other layer with a material bearing a good contact characteristic in relation to other materials.

A gate insulating layer 30 is formed on the insulating substrate 10 with silicon nitride while covering the gate line assembly.

A semiconductor pattern 42 is formed on the gate insulating layer 30 with amorphous silicon while corresponding to the gate electrodes 26. Ohmic contact patterns 55 and 56 are formed on the semiconductor pattern 42 with amorphous silicon where impurities are doped at high concentration.

A data line assembly is formed on the ohmic contact patterns 55 and 56, and the gate insulating layer 30 with a metallic material such as molybdenum (Mo), a molybdenum-tungsten (MoW) alloy, chrome (Cr), tantalum (Ta), and titanium (Ti). The data line assembly includes data lines 62 crossing over the gate lines 22 while defining pixel regions, source electrodes 65 protruded from the data lines 62 while contacting the one-sided ohmic contact pattern 55, and drain electrodes 66 contacting the opposite-sided ohmic contact pattern 56 while being separated from the source electrodes 65 around the gate electrodes 26.

The data line assembly may have a multiple-layered structure where one layer is formed with an aluminum-based conductive material bearing a low resistance, and the other layer with a material bearing a good contact characteristic in relation to other materials.

Color filters of red R, green G and blue B are formed on the gate insulating layer 30 with colored organic materials while covering the data line assembly and the semiconductor pattern 42.

The RGB color filters are repeatedly formed each with a vertical stripe in an alternate manner while bearing a predetermined width. Each color filter has a flat central portion and a peripheral portion with a thickness smaller than the central portion. The peripheral portions of the neighboring color filters are overlapped with each other over the data line 62. The overlapped portion of the color filter has a smallest thickness. It is preferable that the difference in thickness between the central portion of the color filter and the overlapped portion thereof should be established by ½ or less of the central portion, thereby reducing the stepped difference of the color filter.

Alternatively, it is possible that the peripheral portion of the color filter partially covers the central portion of the neighboring color filter. In this case, the color filter layer bears a largest thickness at the overlapping area. It is preferable that the difference in thickness between the central portion of the color filter and the largest thickness portion of the color filter layer should be established to be ½ or less of the central portion.

Furthermore, the RGB color filters may be spaced apart from each other with a predetermined distance over the data lines 62. In this case, it is preferable that the peripheral portion of the color filter has an inclination angle of 40° or less.

When the stepped difference of the color filter is reduced in such a way, the step coverage characteristic of the layers covering the color filters to be processed later can be improved while resulting in flattening of the substrate.

The RGB color filters 72 are provided with contact holes 72 exposing the drain electrodes 66. Pixel electrodes 82 are formed on the color filters such that they are connected to the drain electrodes 66 through the contact holes 72.

The steps of fabricating the thin film transistor array substrate will be now explained with reference to FIGS. 11A to 13B.

Figure 11A:
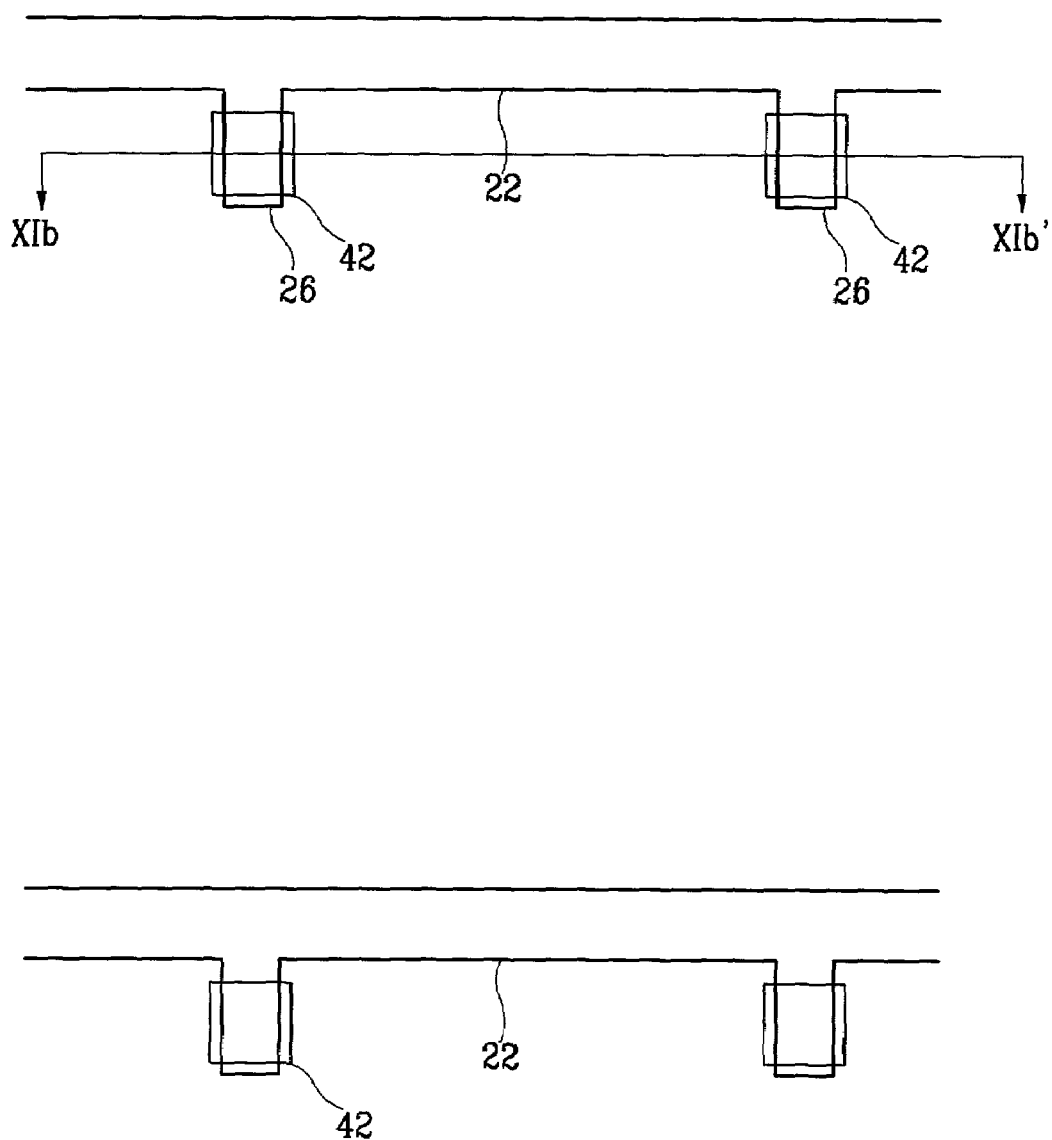
FIG. 11A illustrates the first step of fabricating the thin film transistor array substrate shown in FIG. 10.
Figure 11B:
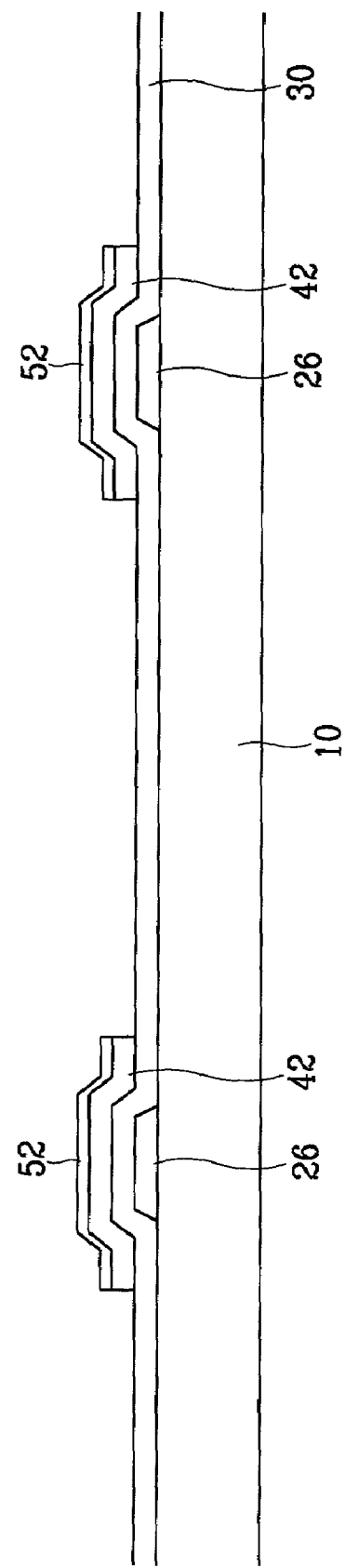
FIG. 11B is a cross sectional view of the thin film transistor array substrate taken along the XIb-XIb' line of FIG. 11A.

As shown in FIGS. 11A and 11B, a metallic layer is deposited onto a substrate 10, and patterned through photolithography to thereby form a gate line assembly. The gate line assembly includes gate lines 22, and gate electrodes 26.

Thereafter, a gate insulating layer 30, a semiconductor layer and an impurities-doped semiconductor layer are sequentially deposited onto the substrate 10. The impurities-doped semiconductor layer and the semiconductor layer are etched through photolithography to thereby form an island-shaped semiconductor pattern 42, and an ohmic contact layer 52.

Figure 12A:
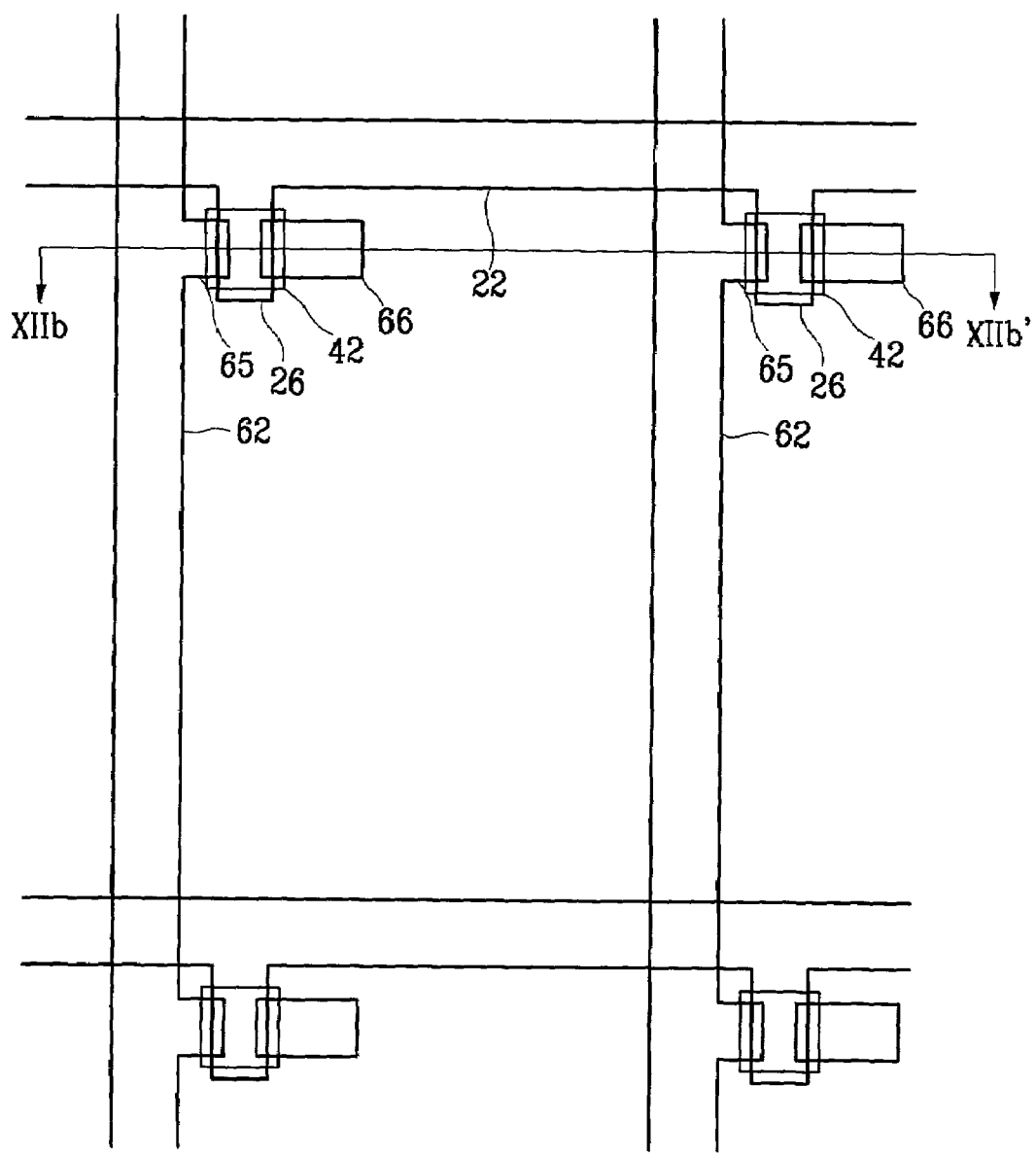
FIG. 12A illustrates the step of fabricating the thin film transistor array substrate shown in FIG. 10 following the step illustrated in FIG. 11A.
Figure 12B:
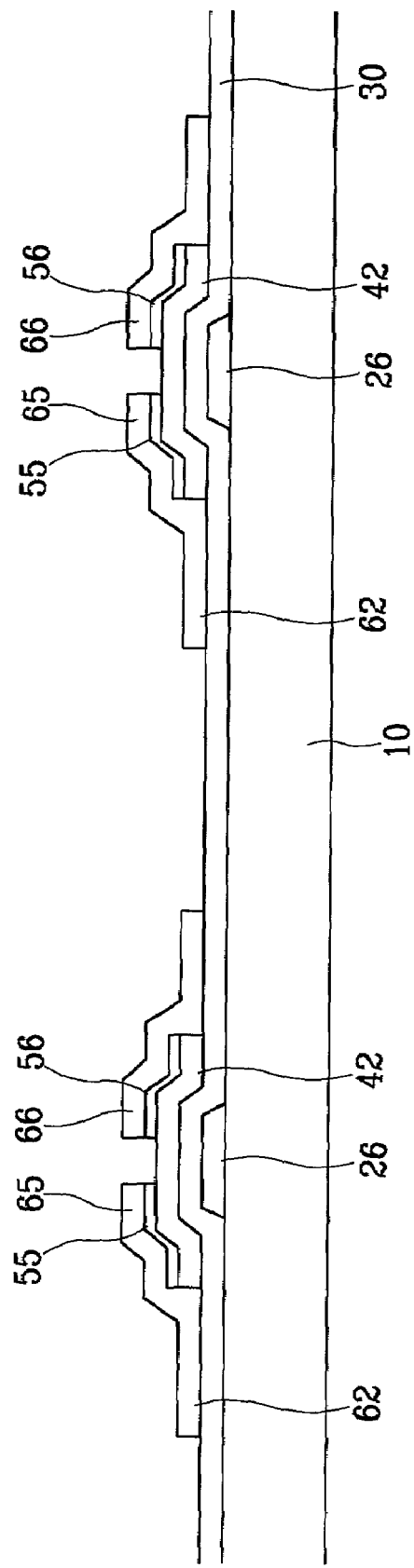
FIG. 12B is a cross sectional view of the thin film transistor array substrate taken along the XIIb-XIIb' line of FIG. 12A.

As shown in FIGS. 12A and 12B, a metallic layer is deposited onto the substrate 10, and patterned through photolithography to thereby form a data line assembly. The data line assembly includes data lines 62, source electrodes 65, and drain electrodes 66.

Thereafter, the island-shaped ohmic contact layer 52 is etched using the source and the drain electrodes 65 and 66 as a mask to thereby form a first ohmic contact pattern 55 contacting the source electrodes 65, and a second ohmic contact pattern 56 contacting the drain electrodes 66.

Figure 13A:
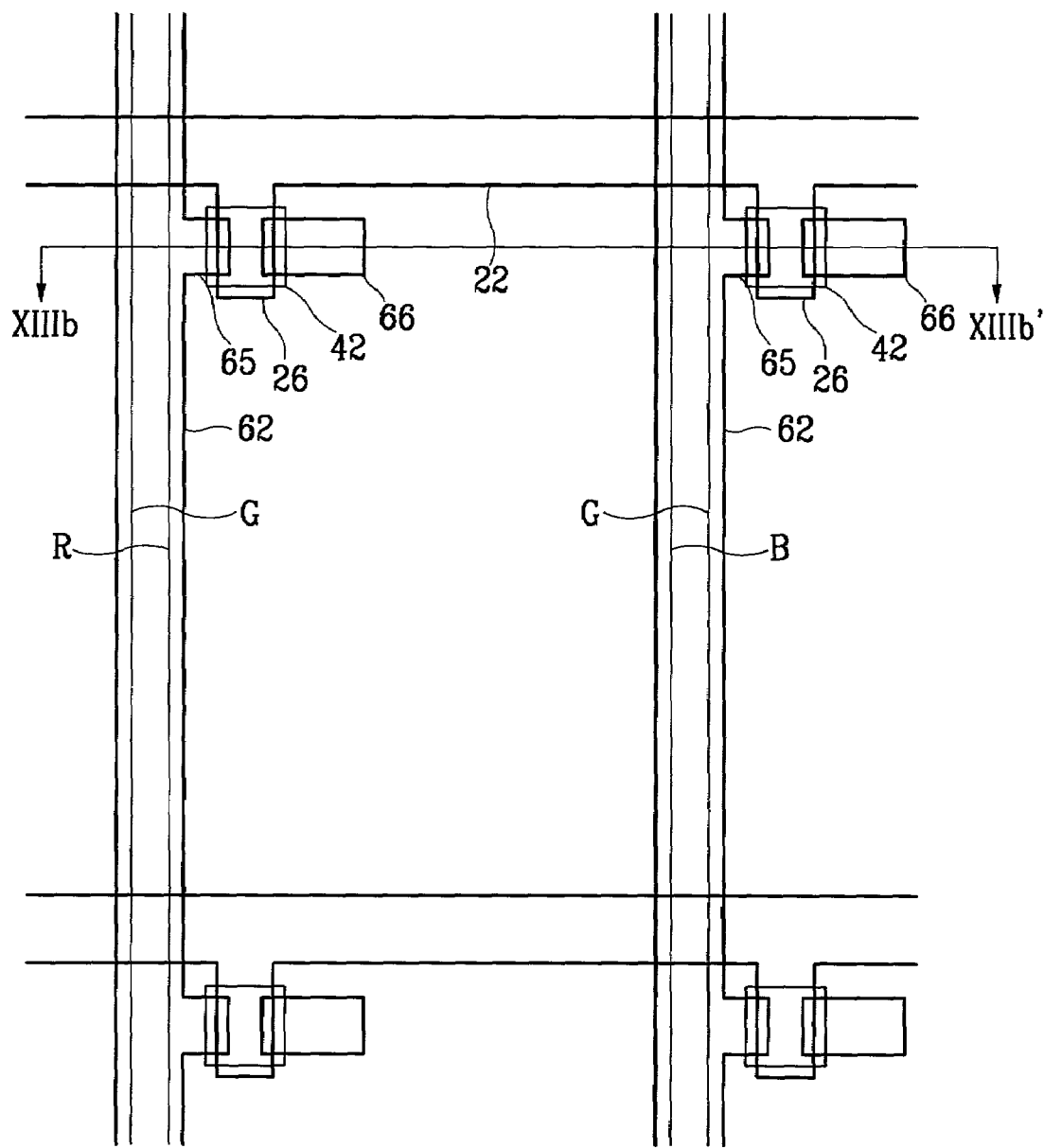
FIG. 13A illustrates the step of fabricating the thin film transistor array substrate shown in FIG. 10 following the step illustrated in FIG. 12A.
Figure 13B:
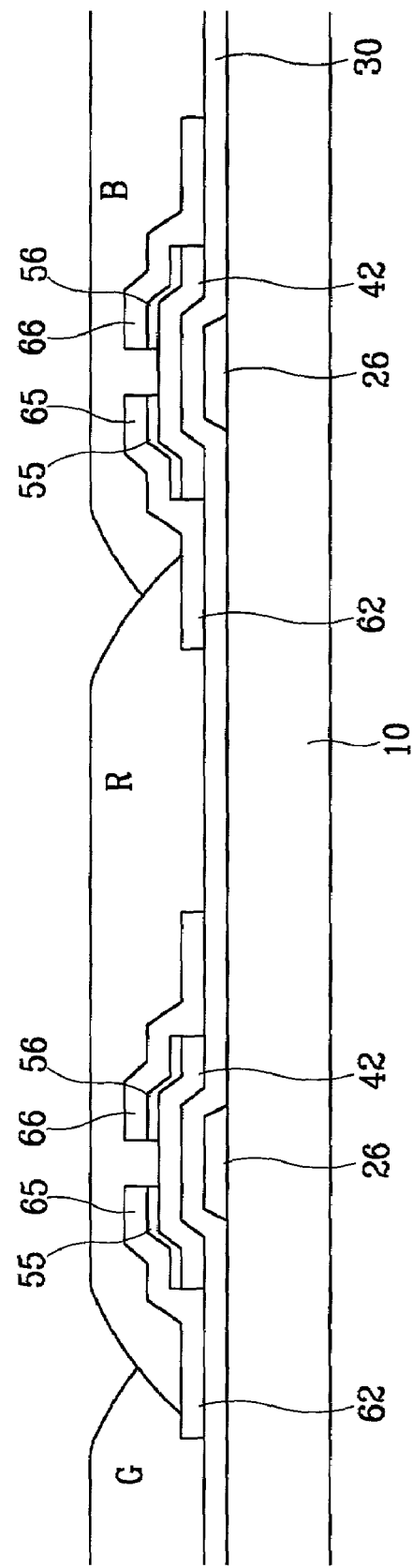
FIG. 13B is a cross sectional view of the thin film transistor array substrate taken along the XIIIb-XIIIb' line of FIG. 13A.

As shown in FIGS. 13A and 13B, RGB color filters are sequentially formed on the data line assembly, the semiconductor pattern, and the gate insulating layer 30, It is preferable that the overlapping of the neighboring color filters should be made over the data lines 63.

As shown in FIGS. 9 and 10, the RGB color filters are patterned through photolithography to thereby form contact holes 72 exposing the drain electrodes 66.

Thereafter, a transparent conductive layer is deposited onto the color filters and the drain electrodes 66 with ITO or IZO. The transparent conductive layer is patterned through photolithography to thereby form pixel electrodes 82. The pixel electrodes 82 are connected to the drain electrodes 66 through the contact holes 72.

The subsequent processing steps are then made to thereby complete a thin film transistor array substrate.

As described above, the peripheral portion of each color filter is reduced in thickness while flattening the substrate, thereby preventing miss-alignment of the liquid crystal molecules and leakage of light occurring due to the stepped difference of the color filter, thereby improving the picture quality.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for fabricating a liquid crystal display, the method comprising:
    forming a black matrix on a substrate; and
    sequentially forming a plurality of color filters neighboring each other on the substrate and the black matrix, each color filter having a flat central portion and a peripheral portion, the peripheral portion overlapping the black matrix and the peripheral portions of the neighboring color filters overlapping and contacting each other,
    wherein the step of sequentially forming the plurality of color filters comprises:
        forming a color filter material over the substrate; and patterning the color filter material by using a mask having a transparent pattern, a semitransparent pattern and an opaque pattern,
wherein the semitransparent pattern is used for forming the peripheral portion of each color filter and the width of the semitransparent pattern is less than that of the black matrix.

2. The method of claim 1, further comprising;
forming a plurality of gate lines on the substrate;
forming a plurality of data lines on the substrate, wherein the plurality of gate lines and the plurality of data lines define a plurality of pixel regions;
forming a thin film transistor in each pixel region, the thin film transistor comprising source electrode, a drain electrode and a gate electrode; and
forming a pixel electrode in each pixel region, the pixel electrode connected to the drain electrode.

3. The method of claim 2, wherein the plurality of color filters comprise a first color filter and a second color filter, the second color filter neighboring and overlapping the first color filter over the data line.

4. The method of claim 3, wherein the peripheral portion of the second color filter overlaps the peripheral portion of the first color filter.

5. The method of claim 1, further comprising forming a common electrode on the plurality of color filters.

6. The method of claim 5, wherein the plurality of color filters comprise a first color filter and a second color filter, the second color filter neighboring and overlapping the first color filter over the black matrix.

7. The method of claim 6, wherein the peripheral portion of the second color filter overlaps the peripheral portion of the first color filter.

* * * * *